Dec. 18, 1962  J. P. MELI ETAL  3,068,717
PUSH-BUTTON TRANSMISSION SELECTOR
Filed Sept. 24, 1959  8 Sheets-Sheet 1

Inventors
Joseph P. Meli
Joseph E. Wright, Jr.
Keith B. Kittle
Richard W. Simpson Dec. 18, 1962 J. P. MELI ETAL 3,068,717
PUSH-BUTTON TRANSMISSION SELECTOR
Filed Sept. 24, 1959 8 Sheets-Sheet 4

Inventors
Joseph P. Meli
Joseph E. Wright, Jr.
Keith B. Kittle
Richard W. Simpson
Andrew F. Winterscheidt
Atty Dec. 18, 1962   J. P. MELI ETAL   3,068,717
PUSH-BUTTON TRANSMISSION SELECTOR
Filed Sept. 24, 1959   8 Sheets-Sheet 7

Inventors
Joseph P. Meli
Joseph E. Wright, Jr.
Keith B. Kittle
Richard W. Simpson United States Patent Office 3,068,717
Patented Dec. 18, 1962

3,068,717
PUSH-BUTTON TRANSMISSION SELECTOR
Joseph P. Meli, Joseph E. Wright, Jr., Keith B. Kittle, and Richard W. Simpson, all of Rockford, Ill., assignors to Atwood Vacuum Machine Company, Rockford, Ill., a corporation of Illinois
Filed Sept. 24, 1959, Ser. No. 842,012
32 Claims. (Cl. 74—483)

This invention relates to push-button selector-ejector mechanisms primarily designed for use in connection with automatic transmissions for motor vehicles, although suitable for other uses, wherever there may be similar requirements to be met.

The principal object of our invention is to provide a thoroughly safe and reliable mechanism of the kind mentioned that is of compact design and construction utilizing stamped sheet metal parts almost entirely, which can be produced in large quantities at low cost and to the required tolerances, and may be easily assembled without too high labor cost.

The mechanism of our invention in the case of an automatic transmission has multiple phases, such as Low, Drive Nos. 1, 2, and so forth, Neutral, Park, and Reverse, and comprises push-button elements, one for each of the phases, a device actuating slide (hereinafter designated "cable actuating slide" because it is usually connected to a control cable extending to the automatic transmission in the case of push-button transmission selectors), and three or more selector-ejector slides. All of these parts are assembled within a suitable housing from which the push-buttons extend from one side in spaced parallel relationship for manual operation, while the cable actuating slide is reciprocable along with the selector-ejector slides in the housing in transverse relation to the push-buttons, the push-buttons being operatively connected with each of the slides by means of a pin and cam slot connection so designed that whenever any one of the push-buttons is in a depressed position, depression of any other push-button will, through the medium of the selector-ejector slides, eject the previously depressed push-button, and the push-button being depressed will move the cable actuating slide to a new but predetermined position, except when the "Park" button is depressed, when a safety lockup action is obtained.

The following novel features are particularly noteworthy:

(1) The cam slots in the selector-ejector slides are shaped in a novel manner in relation to the lineal movement of the pins with the push-buttons so as to obtain better mechanical advantage at the start of slide movement to overcome inertia and frictional resistance to movement of the slides and enable smoother and easier operation with substantially uniform light finger pressure on each push-button throughout its stroke.

(2) The pins, movable with the push-buttons, are guided in one form at their opposite ends in slots provided in the top and bottom walls of the housing, and these slots are parallel to the lineal movement of the pins and are purposely made wider at one end than at the other end with a view to further insuring smoother easier operation, as mentioned above, by virtue of the reduced frictional drag, without, however, sacrificing accuracy of setting of the cable actuating slide, such accuracy being secured by movement of the pins into the narrow ends of the slots where they have a close working fit.

(3) Each of the cam slots in the cable actuating slide has a detent notch to receive the pin on the associated push-button with just enough of a lockup action in the fully depressed position of the button to eliminate any likelihood of the cable actuating slide being shifted accidentally from its selected position, as by reason of vibration in the travel of a car over a rough road, or due to any load applied to the cable actuating slide through the cable itself, and yet these detent notches are not deep enough to interfere with the easy ejection of the depressed button by cam action when another push-button is depressed.

(4) The detent notch provided in the cam slots associated with the "Park" push-button, is purposely elongated as a safety precaution to reduce the likelihood of anyone causing an accident by playing with the buttons when the car is parked, as this elongated detent notch affords a complete lockup action, and one cannot eject the "Park" button by depression of any of the other buttons, but must first actually withdraw the Park button at least part way before depression of any of the other buttons is possible. The associated over-center spring also holds the Park button in its limit position and hence serves as a further safety means.

(5) Over-center springs give an assist action so that when a button is moved past a mid-position in the depression thereof the associated spring is moved past dead-center and helps to move the button the rest of the way in, and, of course, the assist action occurs likewise in the ejection of the button when another button is depressed, so that actually there are two springs active in an assist direction upon each operation of a button, the one cooperating with the button depressed and the other cooperating with the button ejected. All of these springs perform a further important function as anti-rattle means. These springs, in certain forms are provided in connection with the push-buttons, but in another form are provided in connection with the selector ejector slides, for a similar purpose.

(6) The slides are disposed in stacked parallel relationship in the housing with the pins on the push-buttons extending through the cam slots provided therein, and, in one form, in order to insure minimum frictional resistance to operation, rounded bosses are defined on certain of the slides for point contact with the neighboring slides, and elongated bosses are formed in parallel relationship to one another and transverse relationship to the slides on one wall of the housing for line contact with the adjacent edges of said slides, while on the opposite side of the housing a leaf spring is mounted midway between the adjacent elongated bosses having line contact with the edges of the slides on that side thereof, maintaining the slides under spring pressure toward engagement with the adjacent elongated bosses, thereby assuring the proper location of every slide for each push-button depressed while at the same time reducing likelihood of rattle, even though the slides are rather loosely retained in the stacked relationship mentioned in spaced relationship to the top and bottom walls of the housing by rounded bosses on the bottom wall having point contact with the lowermost slide, and downwardly projecting lugs on the top wall terminating in closely spaced relationship to the uppermost slide for point contact therewith.

(7) In another form, bearing guide blocks are mounted in the side walls of the housing and have parallel grooves provided therein in which the edge portions of the slides are slidably received, thus permitting the assembling of the slides on a plurality of these guide blocks as a sub-assembly which can then be dropped into place in the housing.

The invention is illustrated in the accompanying drawings, in which—

FIG. 6 is an exploded perspective view of the parts required for another but similar mechanism of modified or alternative construction, FIG. 7 being a perspective view of a bell-crank lever adapted to be used with the cable actuating slide of either form where the cable movement desired is substantially parallel to the line of travel of the push-buttons;

FIGS. 11–11B are a plan view, front view, and end view, respectively, of still another push-button selector-ejector mechanism made in accordance with our invention;

Similar reference numerals are applied to corresponding parts throughout the views.

Figure 5:
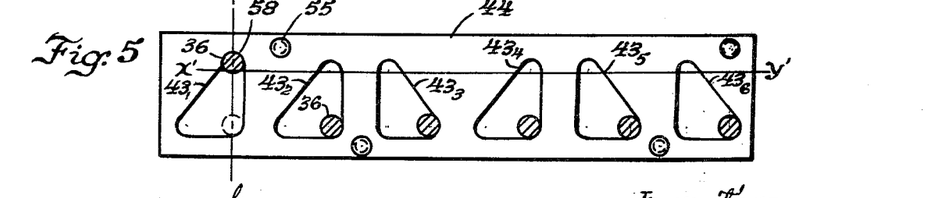

Referring first to FIGS. 1 to 5, buttons numbered 21 to 26 are, in this particular design, in the form of generally L-shaped sheet metal stampings, the downwardly bent end portions 27 being the finger engageable ends adapted to be depressed for selection of the particular phase desired, among:

Low
Drive No. 1
Drive No. 2
Neutral
Park
Reverse each of these buttons, when depressed, causing the automatic ejection of whatever other button was previously depressed, except in the case of the "Park" button 21, which, when depressed all the way, locks the mechanism, as a safety measure, until the button is pulled out to unlock the mechanism. The buttons 21–26 are reciprocable in aligned slots 28 and 29 defined in the front and back walls of the housing 30 between the main body portion 31 of U-shaped cross-section and the cover 32 of inverted U-shaped cross-section when these two parts are secured in any suitable or preferred manner in assembled relationship. In this design, lugs 33 on the four corners of the body portion 31 are received in cut-away corner portions 34 in the cover and bent inwardly over the top of said cover, as best appears in FIG. 1B. Downwardly bent lugs 35 on the inner ends of the buttons 21–26 limit the outward movement of the buttons, and each button carries a pin 36 for slidable engagement with a cam surface on one or another side of a generally triangular-shaped cam slot or opening in the group numbered $37_1$ to $37_6$ shown in FIG. 2 as provided in longitudinally spaced relation to one another in the device or cable actuating slide 38, the slot $37_1$ being associated with the pin 36 on button 21, the slot $37_2$ being associated with the pin 36 on button 22, and so forth. Registering more or less with slots $37_1$–$37_6$ are other generally triangular cam-shaped slots $39_1$–$39_6$ in selector-ejector slide 40 (FIG. 3), also similar generally triangular cam-shaped slots $41_1$–$41_6$ in a second selector-ejector slide 42 (FIG. 4), and another set of similar generally triangular cam-shaped slots $43_1$–$43_6$ provided in a third selector-ejector slide 44 (FIG. 5). The slides 40, 42 and 44 are disposed in stacked relation with slide 38 in housing 30, as illustrated in FIG. 3, being retained in such stacked relationship between the substantially semi-spherical bosses 45 that are struck upwardly from the bottom wall 46 of the body portion 31 of the housing 30, and downwardly bent lugs 47 provided on the cover portion 32 of said housing. Exact alignment of the edge portions of the slides 38, 40, 42 and 44 is assured by their slidable engagement on one longitudinal edge with rounded vertical ribs 48 struck inwardly from the back wall 49 of the housing 30, a single wide leaf spring 50 being caged at the middle of the housing between the front wall 51 of the housing and the adjacent longitudinal edges of the slides and having a rounded vertical rib portion 52 formed at the middle thereof for line contact with the edges of the slides and having outwardly bent end portions 53 anchored in slots 54 provided in the front wall 51 of the housing. Easy sliding action of the slides 38, 40, 42 and 44 is further assured by the provision of upwardly struck semi-spherical bosses 55 on the lowermost slide 44 each having point contact with the bottom of slide 42, and similar downwardly struck bosses 56 on slide 40 each having point contact with the top surface of slide 42, and similar upwardly struck bosses 57 provided on slide 40 each having point contact with the bottom of slide 38. The point contact of bosses 45 with the bottom of slide 44 and the occasional line contact of the ends of lugs 47 with the top of slide 38 are also conducive to easy sliding action of the slides at all times.

Figure 2:
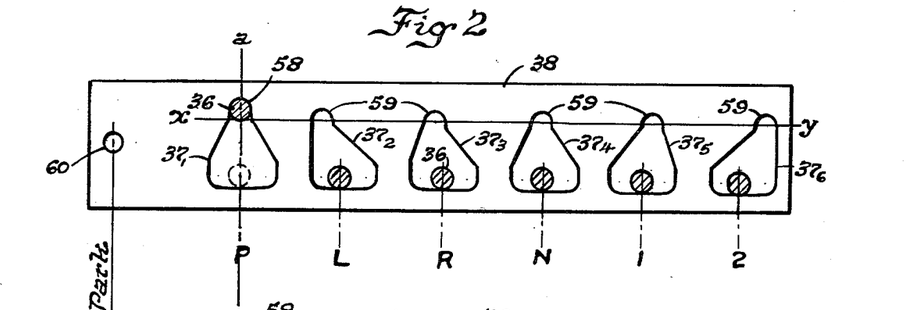
FIG. 2 is a plan view of the cable actuating slide.
Figure 3:
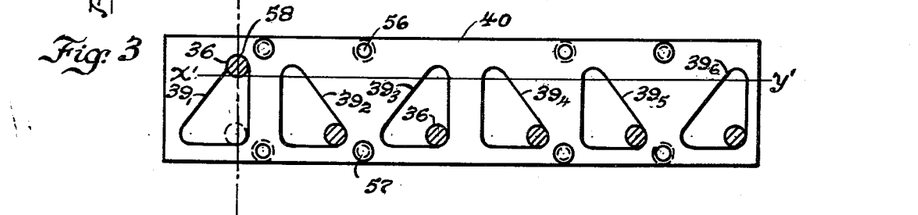
FIGS. 3, 4 and 5 are plan views of the three selector-ejector slides.
Figure 4:
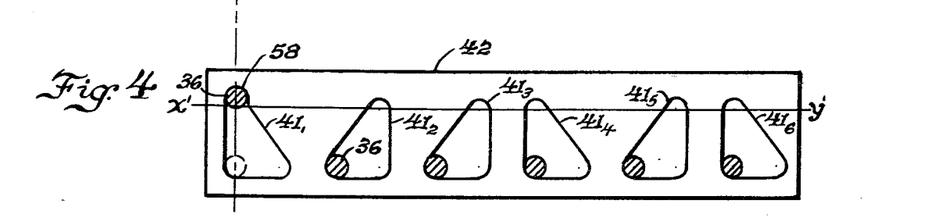
Figures 6, 7:
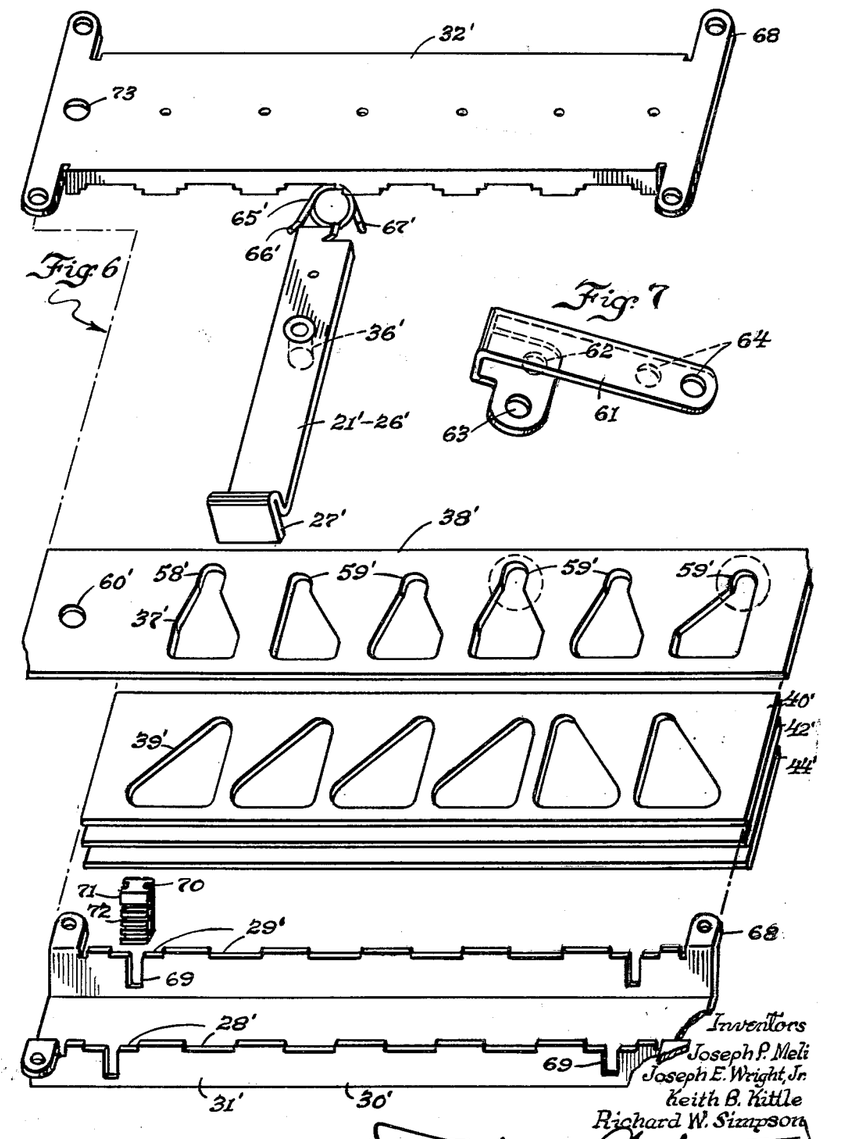

In FIGS. 2 to 5, the slides 38, 40, 42 and 44 are shown in the relationship assumed thereby when the "Park" button 21 is pushed all the way in, so that the pin 36 on button 21 is engaged in the notches 58 formed as extensions of slots 37, 39, 41 and 43, locking the mechanism for safety reasons so that one cannot depress any of the other buttons 22–26 to select another phase. In this "Park" phase it will be seen that the notches 58 provided on all four slides are in register, as indicated by line a—b. Slide 38 has other shorter notches 59 provided therein as extensions of slots $37_2$–$37_6$ all on a longitudinal line x—y, as shown in FIG. 2, and the extent to which each of these notches 59 is offset one way or the other in relation to the associated pin 36 adapted to be engaged therein when the associated push-button in the group 22–26 is depressed is indicative of the amount of endwise movement given the cable actuating slide 38 in one direction or the other. The other pins 36 for "Low," "Reverse," "Neutral" and No. 1 and No. 2 drives are designated in FIG. 2 as L, R, N, 1 and 2 respectively. It is understood that the slide 38 is connected at 60 either directly with the cable extending to the automatic transmission, or, if movement of the cable in a direction transversely relative to the movement of the slide 38 is desired, a bell-crank lever like that illustrated at 61 in FIG. 7 is provided, pivotally mounted on the housing 30 at 62 and pivotally connected at 63 with one end of a link, the other end of which is pivotally connected to the cable actuating slide 38 at 60, while the cable to be actuated is pivotally connected with the lever 61 at 64, thereby moving the cable on a line substantially parallel with the push-buttons. If less increase in cable movement is desired, the cable may be connected to the lever 61 closer to the pivot point 62, as indicated by the dotted line showing of a second hole 64 in FIG. 7, and, of course, this second hole can, if desired, be located at the same radial distance from pivot 62 as the hole 63, if no increase in cable movement is desired. When the pin 36 associated with either of the slides 22–26 is engaged in a notch 59, a semi-safety lockup action is obtained in relation to the full safety lockup action obtained when the pin 36 associated with "Park" button 21 is engaged in registering notches 58 in the four slides, and this semi-safety lockup action is sufficient to eliminate likelihood of accidental shifting from one selected phase to another, either by reason of excessive vibration due to travel over unusually rough roads, or due to a push or pull loading on the cable actuating slide 38 by the cable itself, traceable to the automatic transmission. In other words, there is assurance with the notches 59 that the operator alone can obtain another phase only by depression of the appropriate button, and when that occurs a positive camming action on the pin 36 associated with the previously depressed button is obtained as a result of the actuation of one or another of the selector-ejector slides 40, 42 and 44. The relationship of the apices of slots $39_2$–$39_6$ in slide 40 to notches 59 in slide 38 is indicated by a line $x$—$y$ in FIG. 3, and the same is true of $x'$—$y'$ in FIGS. 4 and 5. Lines $x$—$y$ and $x'$—$y'$ are all completely behind notches 58, and it is apparent, therefore, that the full safety lockup action referred to is obtainable only when the "Park" button 21 is fully depressed, the camming action otherwise obtainable with the slots in the selector-ejector slides 40, 42 and 44 in all of the other phases not being obtainable when the "Park" button is depressed. It is also apparent from inspection of FIGS. 2 to 5 that the operator may withdraw the "Park" button 21 all the way or partway to unlock the mechanism so as to permit depression of any of the other buttons 22–26, so long as the pin 36 is withdrawn from the notches 58 to at least the point where it is on lines $x$—$y$ and $x'$—$y'$, after which depression of any of the other buttons would result in the positive ejection of the "Park" button by cam action of one or the other of the selector-ejector slides 40, 42 and 44.

Six over-center type torsion springs 65 are provided, one for each of the push-buttons 21–26, each spring having one end 66 pivotally connected to the cover 32 of the housing 30 and the other end 67 pivotally connected to the push-button. As a result, viewing button 21 in FIG. 1, where the associated spring 65 is indicated in both its normal position and its moved position, the spring 65 gives an assist action in both the depression of the button and its return to normal position as the end 67 moves past a dead-center position with respect to the end 66 in the reciprocation of the button. Actually, therefore, whnever a button is depressed there are two of these springs 65 effective, after they pass their respective dead-center positions, the one assisting the button being depressed and the other assisting the return of the previously depressed button that is being ejected automatically by cam action. The springs 65, by reason of the way in which they are caged in more or less compressed condition by the buttons 21–26 and the cover 32 of the housing 30, as seen in FIG. 1B, serve to hold the buttons yieldingly against the bottoms of the guide slots 28 and 29 to prevent rattle in the running of the vehicle, when, of course, the mechanism is subjected to more or less vibration. The outward pressure of the springs 65 endwise on the buttons when in their normal or depressed position also is effective so far as an anti-rattle action is concerned.

Figure 1:
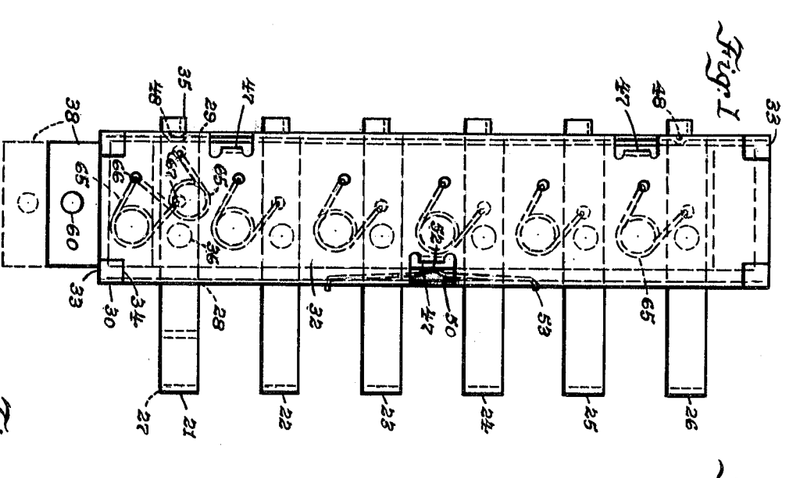
FIGS. 1 and 1A are a plan view and front view, respectively, of a push-button selector-ejector mechanism made in accordance with our invention.
Figure 1A:
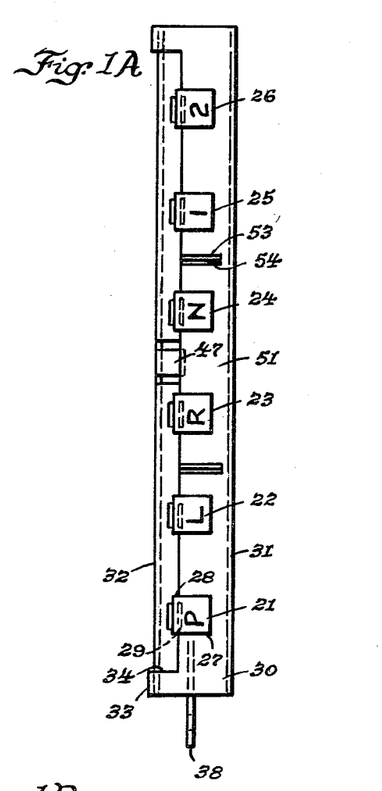
Figure 1B:
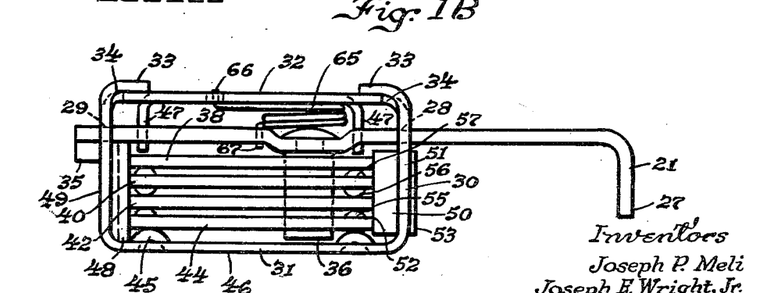
FIG. 1B is an end view shown substantially full size.

In operation, therefore, one may shift from "Neutral" to "Reverse" or from "Neutral" to "Low" or directly to "Drive No. 1" or "Drive No. 2" by merely depressing the appropriate button, the end portions 27 of which will, of course, be suitably labelled, as indicated in FIG. 1A, with the letter "P" for "Park," "L" for "Low," "1" for "Drive No. 1," "2" for "Drive No. 2," "N" for "Neutral" and "R" for "Reverse." When either of the buttons 22–26 is depressed, the depression of another of that group causes first the camming from the semi-safety lockup position of the pin 36 from notch 59 associated with the previously depressed button, and thereafter the positive ejection of that button as the selected button is depressed all the way, an assist action of two springs 65 being effective whenever one of these buttons is depressed, the one spring assisting the ejection of the one button and the other spring assisting in the depression of the other button. When the "Park" button 21 is depressed, a full safety lockup action is obtained by reason of the engagement of the pin 36 in the notches 58, and under those conditions, neither of the other buttons 22–26 can be depressed, all of the selector-ejector slides 40, 42 and 44 being locked. It is only when the "Park" button 21 is pulled out as far as it will go or at least to or beyond the lines $x$—$y$, $x'$—$y'$ that the mechanism is unlocked and depression of any one of the buttons 22–26 is permitted. In the assembling of the mechanism it is a simple matter to stack the slides, insert the pins 36, and then insert the set of slides and buttons in the body portion 31 of the housing 30 in proper relationship to spring 50 and ribs 48, after which the cover 32 can easily be assembled in place with the springs 65 caged between it and the buttons, and then the lugs 33 can be bent over to complete the assembly. Substantially all of the parts being in the form of simple sheet metal stampings capable of being manufactured at low cost to the required tolerances, the present mechanism is made available at a reasonably low cost consistent with thoroughly reliable performance and long life under the most adverse service conditions.

In FIG. 6 we have shown a modified or alternative construction in which the push-buttons, like that shown at 21', are similar to the buttons 21–26 and have finger engageable end portions 27' and carry pins 36' for cooperation with a cable actuating slide 38' and selector-ejector slides 40', 42' and 44' in substantially the same way as described above. The full safety notch 58' and the semi-safety notches 59' indicated on slide 38' are for a similar purpose as notches 58 and 59, above described. Slots 28' and 29' defined between the body portion 31' and cover 32' of housing 30' when these two parts are fastened together by means of screws, bolts, or other fasteners, entered through registering holes in lugs 68 provide guides for the push-buttons, and there are vertical slots 69 in the front and back walls of the body portions 31' of the housing in which the grooved side portions 70 of guide blocks 71 are adapted to be received below the level of the push-buttons and resting on the bottom of the housing. These guide blocks, which are preferably molded of nylon or any other suitable bearing material for low friction sliding of the slides 38', 40', 42' and 44', have four horizontal grooves 72 provided therein in vertically spaced relation for easy slidable reception of the longitudinal edge portions of the slides. A spring 65' is operatively associated with each of the buttons 21'–26' provided in this mechanism, the same having an up-turned end 66' for pivotal connection with the cover 32' of the housing and a down-turned end 67' for pivotal connection with the push-button, whereby to provide the same overcenter spring action as described above in connection with the other mechanism, to assist in the complete depersssion of the buttons and also in the complete ejection thereof, as described above.

The operation of this mechanism is substantially the same as the other first described, but this construction offers an advantage from the standpoint of easier assembling, because the slides 38', 40', 42' and 44' can be assembled in the four blocks 71 first, and then this subassembly can be dropped into place in the body portion 31' of the housing 30', after which the push-buttons 21'–26' can be assembled in the housing with their pins 36' engaged in the registering cam slots 37', 39', 41' and 43' provided in the slides 38', 40', 42' and 44', respectively, and then the cover 32' and the six springs 65' can be applied to complete the assembly. The hole 73 is for pivotal mounting of the lever 61 (FIG. 7) on the housing where the cable actuating slide 38' has a link connection at 60' and 63 with the lever 61 to actuate the cable on a line substantially parallel to the push-buttons.

Figure 8:
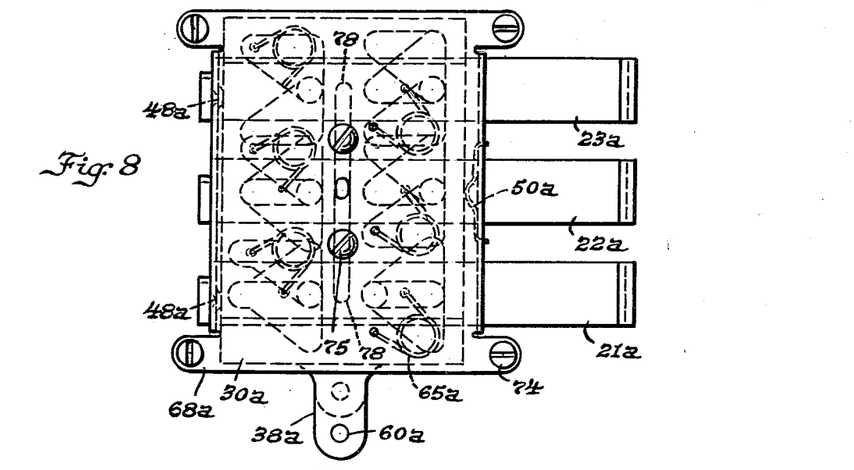
FIG. 8 is a plan view of still another mechanism similar to that of FIG. 1 but modified so that the push-buttons are arranged in banks, it being obvious that if one bank of three is arranged above the other bank of three in a six push-button unit, a housing of substantially half the length can be used.
Figure 8A:
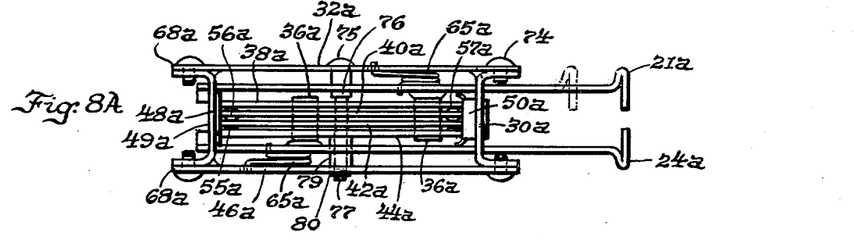
FIG. 8A is an end view of the mechanism shown in FIG. 8.
Figure 8B:
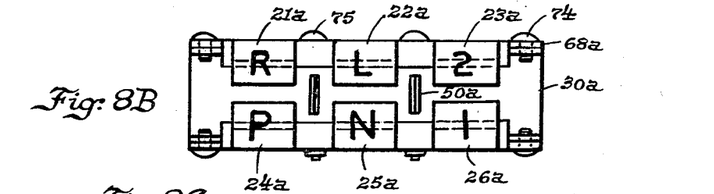
FIGS. 8B and 8C are a front view and rear view, respectively, of the same mechanism.
Figure 8C:
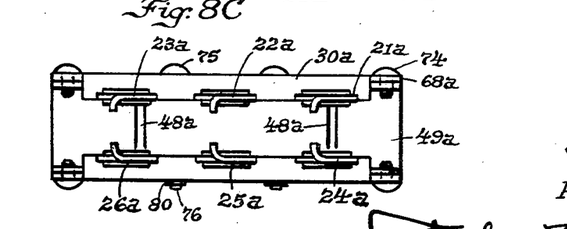

The mechanism shown in FIGS. 8 to 8C is related to that shown in FIGS. 1 to 5. It is a compacted version of that design, having three push-buttons 21a–23a in an upper bank, and three other buttons 24a–26a in a lower bank, all of the buttons being provided with pins 36a, those identified with the upper bank of buttons being in one row and those identified with the lower bank in another row, as best appears in FIG. 8A. The same type of springs 65a is provided to give the overcenter spring action described above for assist in the complete depression of a button and assist in the complete ejection thereof. Vertical ribs 48a are formed in the back wall 49a of the housing 30a for line contact with the rear edges of the cable actuating slide 38a and the selector-ejector slides 40a, 42a and 44a disposed in stacked relation in the housing, similarly as in the first construction described. The leaf spring 50a has slidable engagement with the front longitudinal edges of the four slides and keeps the same under light spring pressure in engagement with ribs 48a at all times. In this construction, the housing 30a has the top 32a and bottom 46a both removable, the same having lugs 68a on the four corners adapted to be secured by means of screws 74 to lugs provided on the four corners of the housing, this variation in construction being necessary because of the way in which the upper bank of buttons are assembled into the top of the housing and the lower bank of buttons into the bottom, as is best understood by inspection of FIG. 8A. Here again, the bottom slide 44a has upwardly projecting bosses 55a provided thereon for line contact with the bottom of the slide 42a, and slide 40a has one set of downwardly projecting bosses 56a for point contact with the top of slide 42a, and another set of upwardly projecting bosses 57a for point contact with the bottom of the slide 38a, thereby maintaining the spaced relationship of the slides and insuring low friction sliding operation and minimum wear. Screws 75, which are entered through holes in the top cover 32a, provide annular shoulders 76 just above the reduced shank portions 77 which are received in longitudinal slots 78 provided therefor in the four slides, whereby to limit upward displacement of the slides, downward displacement being limited by collars 79 disposed between the bottom slide 44a and the bottom cover 46a and held in place by the reduced shank portions 77 of the screws 75, the latter being threaded in bosses 80 provided therefor in the bottom cover 46a.

The operation of this mechanism is substantially the same as that of FIGS. 1 to 5, and also substantially the same as that of FIG. 6. Obviously, each of the four slides 38a, 40a, 42a and 44a has the same group of cam slots provided therein, but instead of being arranged in a single row of six, as in FIGS. 2 to 5, the slots are arranged in two rows of three each, as indicated in dotted lines in FIG. 8. Here again, if the cable that is operated by the slide 38a is not directly connected with the slide at 60a, it may be operated by a bell-crank lever like that shown at 61 in FIG. 7, which in turn has a link connection with the slide 38a, so as to operate the cable on a line substantially parallel to the push-buttons.

Figures 9, 10:
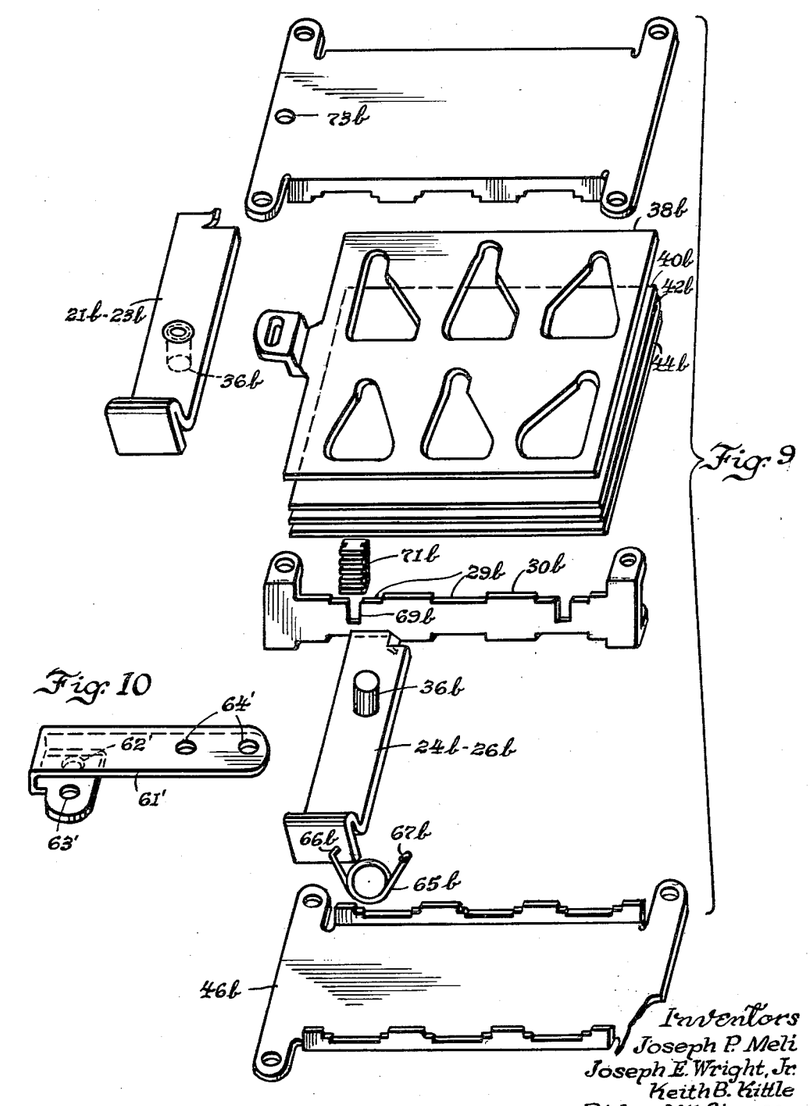
FIG. 9 is an exploded perspective similar to FIG. 6, but showing a mechanism bearing the same relationship to that of FIG. 8 that the mechanism of FIG. 6 bears to that of FIG. 1.
FIG. 10 is a perspective view of a bell crank lever similar to that of FIG. 7 adapted to be used with the cable actuating slide of FIG. 9.

Referring next to FIG. 9, this mechanism bears the same relationship to that of FIGS. 8 to 8C as the mechanism of FIG. 6 bears to that of FIGS. 1 to 1B, namely, that guide blocks 71b, molded of nylon or any other suitable bearing material to assure low friction sliding movement of the slides 38b, 40b, 42b and 44b, are arranged to be assembled in the side walls of the housing 30b in slots 69b under push-buttons of the upper bank, and over push-buttons of the lower bank, one of the upper bank of push-buttons of the group 21b–23b being illustrated and one of the push-buttons of the group 24b–26b being illustrated. In view of the close similarity otherwise to the two other constructions mentioned, no further description is considered necessary, inasmuch as corresponding parts have all been numbered correspondingly. The lever 61' shown in FIG. 10 is similar to that shown in FIG. 7, and is intended to be used with the mechanism of FIG. 9 in the same way as lever 61 has been described as useable with the constructions of FIGS. 1, 6 and 10.

Additional features, not shown, could be incorporated easily in either of the four mechanisms described above. For example, the reverse push-button can be operatively connected directly with a back-up light switch so as to turn the backup lights on automatically whenever this button is depressed, and turn them off again when this button is ejected.

Figures 11, 11A:
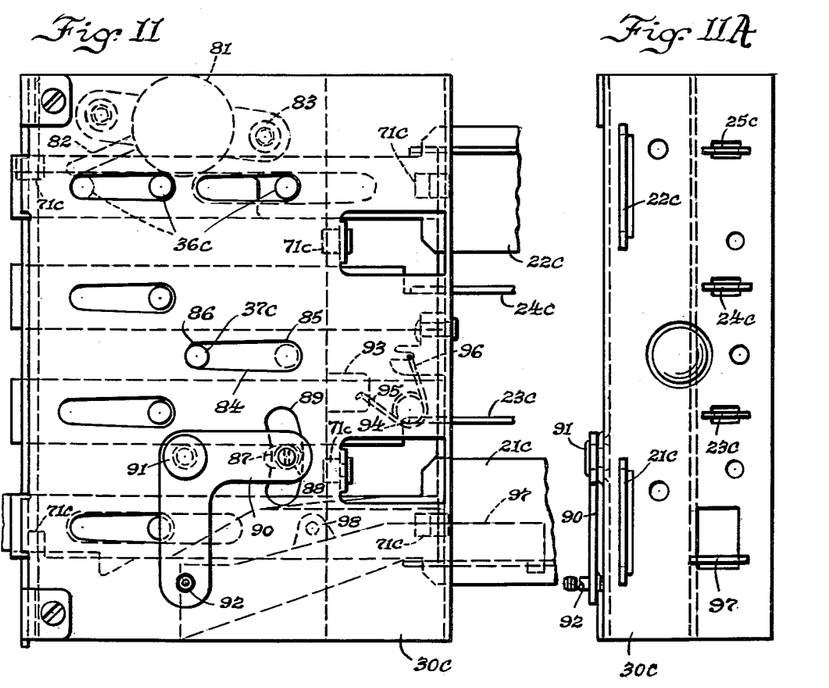
Figure 11B:
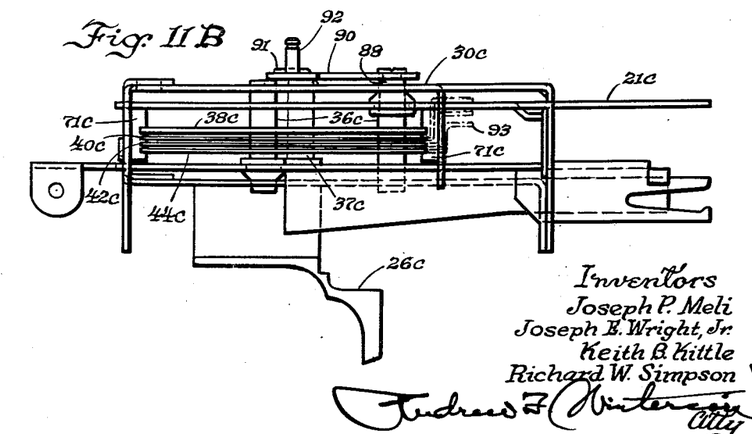
Figure 12:
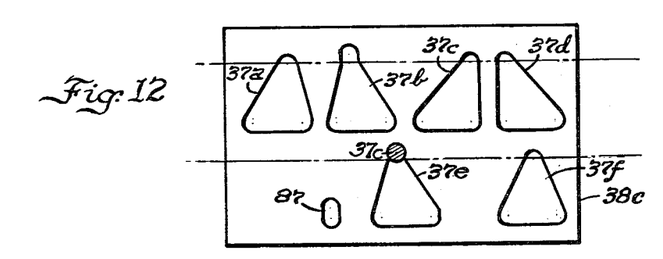
FIGS. 12–15 are plan views of the cable actuating slide and the three selector-ejector slides in FIGS. 11–11B.
Figure 14:
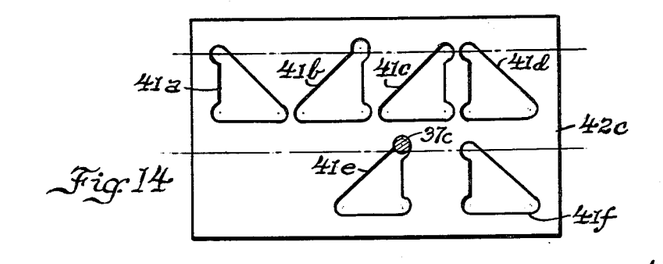
Figure 15:
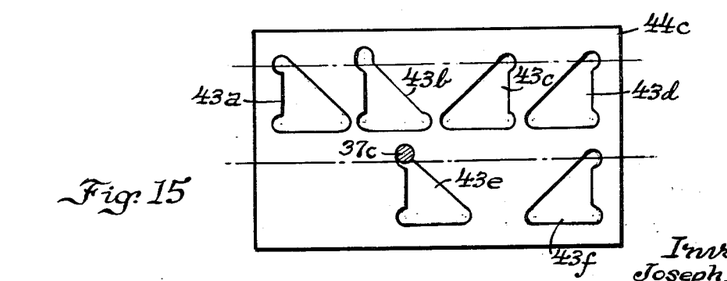

Referring next to FIGS. 11–11B, this mechanism is similar to that of FIG. 9, the same having guide blocks 71c, molded of nylon or any other suitable bearing material to assure low friction sliding movement of slides 38c (FIG. 12), 40c (FIG. 13), 42c (FIG. 14) and 44c (FIG. 15). The guide blocks are suitably mounted in the walls of the housing 30c, in which push-buttons numbered 21c–26c are slidably guided in slots at the front and back of said housing. Push-button 25c, which happens to be the 'Reverse" button, in addition to actuating the cable actuating slide 38c by means of its related pin 36c, operates the back-up light switch 81 by slidably engaging its projecting arm 82, the switch 81 being suitably secured in one end of the housing 30c, as indicated at 83 in FIG. 11. The arm 82 is spring-pressed toward engagement with the pin 36c, and is indicated in its one extreme position corresponding to the dotted line position of the pin 36c, but this arm will, of course, return under its spring action when the "Reverse" button 25c is ejected, thus, turning the back-up lights off. The "Park" push-button is indicated at 26c in FIG. 11B below the housing 30c, and the pin 37c actuated thereby is shown in the "in" position at the rear end of the guide slots 84 provided in the top and bottom walls of the housing 30c, similar slots being provided for guidance of the upper and lower ends of all of the other pins 36c. It is manifest that the pin 37c, in addition to actuating the cable actuating slide 38c to a given position, could also perform another related function. It is important to note in FIG. 11 that the slots 84 are wider at one end 85 than at the other end 86. The purpose of this is to reduce friction drag and accordingly enable smoother and easier operation of the push-buttons, without, however, sacrificing any accuracy in the position of the cable actuating slide 38c, the pins 36c and 37c, when moved to the other end 86 of the slots 84, being closely confined, as required for precise positioning of the cable actuating slide 38c. A slot 87 in slide 38c slidably receives a pin 88 projecting downwardly through an arcuate slot 89 provided in the top wall of the housing 30c, whereby in the back and forth movement of the cable actuating slide 38c, to oscillate the bell crank lever 90 that is pivotally mounted on top of the housing 30c at 91, and has an attaching post 92 provided on one arm thereof for pivotal connection with the cable to be actuated, thus permitting movement of the cable in a direction transverse to the direction of movement of the cable actuating slide 38c and more or less in line with the push-button movement. Each of the selector-ejector slides 40c, 42c and 44c has a forwardly projecting tab 93, and in connection with each of these tabs we provide an over-center spring 94, one arm 95 of which is pivotally connected with the tab and the other arm 96 is pivotally connected with the housing 30c, whereby, in addition to the assist action of the over-center springs cooperating with the push-buttons, as indicated at 65 in FIG. 1, 65a in FIG. 8, and 65b in FIG. 9, we obtain a highly desirable assist action in the movement of the selector-ejector slides, insuring their movement from one extreme position to the other exereme position. The tabs 93 have their outer ends spaced far enough apart, as clearly appears in FIG. 11B, to provide operating clearance for the over-center springs 95, despite the close spacing of the selector-ejector slides 40c, 42c and 44c.

The operation of this mechanism is substantially the same as that of FIG. 9 and the other mechanisms previously described, but isolating the "Park" button 26c more or less in relation to the others 21c–25c, is considered to have certain advantages for most motorists. The button 97 projecting from the front of the housing 30c with the buttons 21c–25c is a brake release button, and has a cable connected to the ear 98 thereof, extending to the emergency brake mechanism, for release of the brake when the button is depressed, this arrangement being considered advantageous because it eliminates the necessity for a separate mounting for the brake release button, and enables use of the same light source used in connection with the plastic buttons that are mounted on the ends of push-buttons 21c–25c and 97 to illuminate the same for convenience of identification. The "Park" button 26c, which preferably extends the full width of the housing 30c, for convenience of manipulation, is suitably guided at its opposite ends with respect to the bottom of the housing. The "Park" button 26c has its pin 37c cooperating with the generally triangular shaped cam slots 37e, 39e, 41e and 43e, shown in FIGS. 12–15, as provided in the cable actuating slide 38c and the selector-ejector slides 40c, 42c and 44c, respectively. Pins 36c extend through all of the other registering generally triangular shaped cam slots in the four slides similarly as in the other constructions previously described, the only different in the present construction being that there are four of these cam slots in one row on each of the slides instead of six in a row in an earlier form or three in a row in another form, the present form having four in one row and two in another row in each slide.

Figure 13:
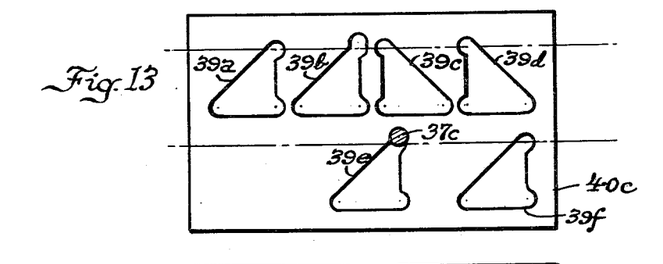
Figure 16:
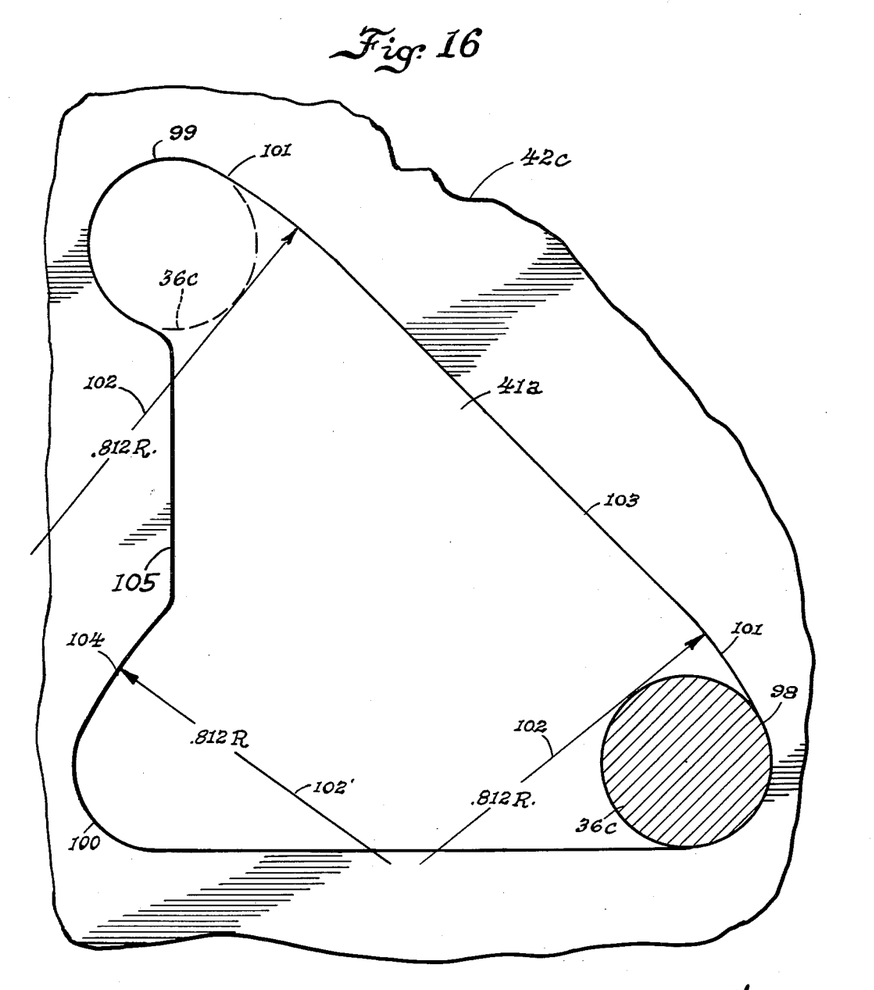
FIG. 16 is an enlargement of one of the slots in the selector-ejector slides to better illustrate the novel way in which the end portions are shaped for better mechanical advantage both for the incoming pin carried on the push-button being depressed and the outgoing pin carried on the button being ejected.

In conclusion, attention is called to FIG. 16 which is related to FIGS. 13 and 15 and serves to illustrate more clearly the special shape given to the three ends or corners of each generally triangular shaped cam slot in the selector-ejector slides with a view to obtaining better mechanical advantage at the start of slide movement to overcome inertia and frictional resistance to movement of the slides and enable smoother and easier operation with substantially uniform light finger pressure on each push-button throughout its stroke. Viewing FIG. 16, it will be seen that the ends 98, 99 and 100 on the generally triangular slots 39a–39f and 41a–41f and 43a–43f in the selector-ejector slides, instead of having both adjoining sides of each slot tangent to the arcs of these end portions have the one side 101 relieved on an arc of relatively long radius, as indicated at 102, and this long radius arc is tangent to the side 103 of the slot between the ends 98 and 99, and a similar relief is provided on one side 104 of the third end 100 of the triangular slot, the arcuate relief 104 being struck on a radius 102' the same as the radii 102. Thus, assuming the pin in the end 98 of one of the slots is the incoming pin operated by a push-button and that the outgoing pin in another slot is in the end 99 of that slot, the pressure required on the push-button to start the sliding of the selector-ejector slides 40c, 42c and 44c is reduced appreciably by reason of the greater mechanical advantage obtained by the relief at 101 adjacent the end 98 as the incoming pin moves forwardly toward sliding engagement with the side 103 of the slot. In a similar way this incoming pin when disposed in the other end 99 of the slot as an outgoing pin encounters less resistance to its initial movement toward the side 103 of the slot and consequently both the incoming and outgoing pins have their initial movement more easily, and once the selector-ejector slides are in motion and the pins are sliding on the intermediate portions 103 of the slots, where there is less mechanical advantage, the pressure on the push-button is no greater than it was at the beginning of the push-button movement, and the operator can move a push-button its full stroke with substantially uniform finger pressure. The offsetting of the ends 99 and 100 with respect to the intermediate side 105 of the triangular slot gives a semi-lockup action comparable to that first described in connection with the cable actuating slide 38 where the ends 59 of slots $37_2$–$37_6$ were similarly extended. These offsets taken in combination with the use of the over-center springs 94, which insures full length movement of each of the selector-ejector slides from one extreme position to the other, insures precise positioning of the cable actuating slide 38c each time a push-button is depressed.

It is believed the foregoing description conveys a good understanding of the objects and advantages of our invention. The appended claims have been drawn to cover all legitimate modifications and adaptations.

We claim:

1. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, and an over-center spring resisting depression and ejection of each button up to the spring's dead-center position and assisting the movement therebeyond, whereby both the button depressed and the button ejected are similarly assisted in the final portion of their movements.

2. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, said cam slots having side edges slidably engaged by said pins and disposed in angular relationship to the line of travel of the buttons, whereby a given movement of a pin in the depression of a button results in a given movement of the slides, the end portions of said side edges for initial movement of the slides being given lesser angulation than the rest of said side edges for increased mechanical advantage and easier operation of the buttons.

3. A push-button operated selector-ejector mechanism as set forth in claim 2, wherein the end portions of said pins are slidable in parallel guide slots provided in said frame, the slots being parallel to the line of travel of the buttons and wide in relation to the end portions of the pins for extra working clearance and low friction operation throughout the major portion of the length thereof from one end but being narrower at the other end for relatively close fitting of the pins therein and more accurate positioning of the device actuating slide in the depression of any one of said buttons.

4. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel, of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, the pins having end portions slidable in parallel guide slots provided therefor in the frame, the slots being wide in relation to the end portions of the pins for extra working clearance and low friction operation throughout the major portion of the button movement but being narrower at the pin position determining end for relatively close fitting of the pins therein for the more accurate positioning of the device actuating slide by the pins in the depression of any one of said buttons.

5. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, said cam slots having side edges slidably engaged by said pins and disposed in angular relationship to the line of travel of the buttons, whereby a given movement of a pin in the depression of a button results in a given movement of the slides, the slots in one of said slides each terminating at one end in a detent notch adapted to be entered by the pin associated with the button depressed for a lockup action in the fully depressed position of the button.

6. A push-button operated selector-ejector mechanism as set forth in claim 5, wherein at least one of the buttons when fully depressed is intended to lock the mechanism against operation by depression of another button until the aforesaid button is withdrawn again, the slot in the last mentioned slide receiving the pin associated with said button having the detent notch elongated to receive the pin in the fully depressed position of the button for a greater lockup action.

7. A push-button operated selector-ejector mechanism as set forth in claim 5, including an over-center spring resisting depression and ejection of each button up to the spring's dead-center position and assisting the movement therebeyond, whereby the pin on the button depressed is held under the spring pressure in the detent notch for a more secure lockup action in the fully depressed position of the button.

8. A push-button operated selector-ejector mechanism as set forth in claim 6, including an over-center spring resisting depression and ejection of the last mentioned button up to the spring's dead-center position and assisting the movement therebeyond, whereby said button is held engaged in the elongated detent notch under spring pressure for a more secure lockup action.

9. A push-button operable selector-ejector mechanism adapted for use with an automatic transmission for a motor vehicle, said mechanism comprising a frame, a plurality of individually manually operable push-buttons including extensions that are mounted for reciprocation in parallelism on said frames, one of which buttons is a "Park" button for setting and locking the transmission in neutral, all of the buttons being depressible to the same extent, except said "Park" button, which is adapted to be depressed a little farther, and motion transmitting means including slide means operatively connected with the transmission on the one hand and with said button extensions on the other hand for control of the transmission, said slide means being reciprocable in said frame transversely relative to the button extensions in response to depression of any one of said buttons, whereby upon depression of any one of said buttons said mechanism is adapted to set the transmission according to the button depressed, except when the "Park" button is depressed to its limit position, when the transmission is locked in neutral until the "Park" button is withdrawn from locking position.

10. A mechanism as set forth in claim 9 including over-center spring means resisting depression and ejection of said push-buttons up to a dead-center position of said means and assisting movement of said buttons therebeyond, whereby the button being depressed and the button being ejected are both assisted toward their limit positions.

11. A mechanism as set forth in claim 9 including means providing a semi-lockup action in the fully depressed position of each of the buttons, except the "Park" button whereby yieldingly to resist accidental ejection of said buttons whenever either of these is fully depressed.

12. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, and means providing a lockup action in the fully depressed position of one of the buttons, whereby to prevent accidental ejection of said button whenever fully depressed.

13. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined positioned identified with that specific button, means providing a lockup action in the fully depressed position of one of the buttons, whereby positively to prevent accidental ejection of said button whenever fully depressed, and means providing a semi-lockup action in the fully depressed position of each of the other buttons, whereby yieldingly to resist accidental ejection of said buttons whenever either of these is fully depressed.

14. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, an over-center spring resisting depression and ejection of each button up to the spring's dead-center position and assisting the movement therebeyond, whereby both the button depressed and the button ejected are similarly assisted in the final portion of their movements, said over-center spring means resisting accidental ejection of a button whenever fully depressed, and means independent of said spring means providing a lockup action of at least one of said buttons, whereby to resist accidental ejection of said button whenever fully depressed.

15. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button, and means maintaining the slides in spaced parallel relationship and guiding the same for reciprocatory movement with respect to one another with minimum frictional drag.

16. Mechanism as set forth in claim 15 wherein said last named means includes rounded bosses projecting from certain of said slides having low-friction bearing engagement on the surfaces of neighboring slides.

17. Mechanism as set forth in claim 15 wherein said last named means includes elongated bosses on one side of said frame in transverse relationship to and having low friction sliding engagement on the adjacent longitudinal edges on one side of said slides, and leaf spring means between the other side of said frame and the side of said slides and having low friction sliding engagement on the adjacent longitudinal edges of said slides and applying yielding pressure on said slides in the planes thereof toward the bosses.

18. Mechanism as set forth in claim 15 wherein the slides are horizontally disposed in a vertical stack, and said last named means includes rounded bosses projecting upwardly from the bottom of said frame for low friction bearing engagement on the bottom of the lowermost slide, other rounded bosses projecting from certain of said slides having low friction bearing engagement on neighboring slides, and other projections on the top of said frame slidably engaging the top of the uppermost slide to limit upward displacement thereof.

19. Mechanism as set forth in claim 15 wherein said last named means includes guide blocks in parallel relationship on the opposite sides of said frame having grooves provided therein on the inner face thereof in parallel relationship slidably receiving the adjacent longitudinal edge portions of said slides.

20. Mechanism as set forth in claim 15 wherein said last named means includes guide blocks in parallel relationship on the opposite sides of said frame having grooves provided therein on the inner face thereof in parallel relationship slidably receiving the adjacent longitudinal edge portions of said slides, said blocks being of a material in which the slides, which are metallic, are slidable with low friction.

21. Mechanism as set forth in claim 15 wherein said last named means includes guide blocks in parallel relationship on the opposite sides of said frame having grooves provided therein on the inner face thereof in parallel relationship slidably receiving the adjacent longitudinal edge portions of said slides, said blocks being of a material in which the slides, which are metallic, are slidable with low friction, said blocks having grooves provided therein lengthwise of the opposite sides thereof, and the frame having openings provided therein having parallel side edge portions slidably received in said grooves to mount the blocks on said frame.

22. Mechanism as set forth in claim 15 wherein said last named means includes guide blocks in parallel relationship on the opposite sides of said frame having grooves provided therein on the inner face thereof in parallel relationship slidably receiving the adjacent longitudinal edge portions of said slides, said blocks having grooves provided therein lengthwise of the opposite sides thereof, and the frame having openings provided therein having parallel side edge portions slidably received in said grooves to mount the blocks on said frame.

23. A push-button operated selector-ejector mechanism comprising a frame, manually operable push-buttons reciprocably mounted on said frame for selective operation in parallel relationship to one another, each push-button carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having generally triangular-shaped cam slots provided therein, the base portions of the triangles of which are all substantially parallel to one another and at right angles to the parallel lines of travel of the push-buttons, the triangles having inclined sides defining cam surfaces for slidable engagement with said pins to cam the slides endwise in transverse relationship to the parallel lines of travel of the push-buttons, the triangular cam slots in the several slides being disposed in different registering relationship for each operating position of the device actuating slide and for each corresponding button depressed so that when any one of said buttons is depressed the pin associated therewith causes the actuating slide to be moved by cam action to a predetermined position identified with that specific button.

24. A mechanism as set forth in claim 23 wherein all of the triangular cam slots in the selector-ejector slides and device actuating slide have their base portions in a common plane, the apex portions of the triangular slots in all of the selector-ejector slides and the apex portions of certain of the triangular slots in the device actuating slide being in a common plane parallel to the first plane, the apex portions of the said triangular slots in at least one of the slides defining detent notches so that when the pin on a push-button engages in said detent notch upon completion of the movement of said button a lockup action is obtained resisting change in the setting of the mechanism until another push-button is depressed for a new setting.

25. A mechanism as set forth in claim 23 wherein all of the triangular cam slots in the selector-ejector slides and device actuating slide have their base portions in a common plane, the apex portions of the triangular slots in all of the selector-ejector slides and the apex portions of all but one of the triangular slots in the device actuating slide being disposed in a common plane parallel to the first-mentioned plane, the remaining triangular slot in the device actuating slide having a detent notch extension on the apex portion beyond the plane of the apex portion of the rest of the triangular slots in said device actuating slide wherein the pin on the related one of said buttons engages at the limit of push-button movement whereby positively to lock the mechanism in a predetermined setting, so that depression of either of the other push-buttons is impossible until this push-button is withdrawn at least enough to disengage the pin from the detent notch extension.

26. A mechanism as set forth in claim 23 wherein all of the triangular cam slots in the selector-ejector slides and device actuating slide have their base portions in a common plane, the apex portions of the triangular slots in all of the selector-ejector slides and the apex portions of certain of the triangular slots in the device actuating slide being in a common plane parallel to the first plane, the apex portions of the said triangular slots in at least one of the slides defining detent notches so that when the pin on a push-button engages in said detent notch upon completion of the movement of said button a lockup action is obtained resisting change in the setting of the mechanism until another push-button is depressed for a new setting, the apex portion of at least one of the triangular slots in the device actuating slide being defined by a detent notch extension beyond the plane of the apex portions of the other triangular slots in said device actuating slide, whereby when the pin on the push-button associated with said triangular slot is engaged in the detent notch extension upon full depression of the push-button the mechanism is locked in this setting and none of the other push-buttons can be depressed until this push-button is withdrawn at least enough to disengage the pin from the extension notch.

27. A mechanism as set forth in claim 24 wherein additional detent notches are defined in the apexes at the ends of the base portions of said triangular slots for reception of other pins of other push-buttons to give increased lockup action resisting change in the setting of the mechanism until another push-button is depressed for a new setting.

28. A mechanism as set forth in claim 24 wherein additional detent notches are defined in the apexes at the ends of the base portions of said triangular slots for reception of other pins of other push-buttons to give increased lockup action resisting change in the setting of the mechanism until another push-button is depressed for a new setting, the apex portion of at least one of the triangular slots in the device actuating slide being defined by a detent notch extension beyond the plane of the apex portions of the other triangular slots in said device actuating slide, whereby when the pin on the push-button associated with said triangular slot is engaged in the detent notch extension upon full depression of the push-button the mechanism is locked in this setting and none of the other push-buttons can be depressed until this push-button is withdrawn at least enough to disengage the pin from the extension notch.

29. A push-button operated selector-ejector mechanism comprising a frame, manually operable push-buttons reciprocably mounted on said frame for selective operation in parallel relationship to one another, each push-button carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having generally triangular-shaped cam slots provided therein, the base portions of the triangles of which are all substantially parallel to one another and at right angles to the parallel lines of travel of the push-buttons, the triangles having inclined sides defining cam surfaces for slidable engagement with said pins to cam the slides endwise in transverse relationship to the parallel lines of travel of the push-buttons, the triangular cam slots in the several slides being disposed in different registering relationship for each operating position of the device actuating slide and for each corresponding button depressed so that when any one of said buttons is depressed the pin associated therewith causes the actuating slide to be moved by cam action to a predetermined position identified with that specific button, all of the triangular cam slots in the slides having their base portions in a common plane, the base angles of the triangles being arcuately conformed on a radius to fit the pins, said arcuate portions being of inwardly flaring form to give better mechanical advantage in the cam action of the pins by the slides and vice versa.

30. A push-button operated selector-ejector mechanism comprising a frame, manually operable push-buttons reciprocably mounted on said frame for selective operation in parallel relationship to one another, each push-button carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having generally triangular-shaped cam slots provided therein, the base portions of the triangles of which are all substantially parallel to one another and at right angles to the parallel lines of travel of the push-buttons, the triangles having inclined sides defining cam surfaces for slidable engagement with said pins to cam the slides endwise in transverse relationship to the parallel lines of travel of the push-buttons, the triangular cam slots in the several slides being disposed in different registering relationship for each operating position of the device actuating slide and for each corresponding button depressed so that when any one of said buttons is depressed the pin associated therewith causes the actuating slide to be moved by cam action to a predetermined position identified with that specific button, all of the triangular cam slots in the slides having their base portions in a common plane, the base angles of the triangles being arcuately conformed on a radius to fit the pins, said arcuate portions being of inwardly flaring form to give better mechanical advantage in the cam action of the pins by the slides and vice versa, the apex portions of certain of the triangular slots in the selector-ejector slides also lying in a common plane parallel to the first mentioned plane, these apex angles of the triangles being also arcuately conformed on a radius to fit the pins and being of inwardly flaring form to give better mechanical advantage in the cam action of the pins by the slides and vice versa.

31. A push-button operated selector-ejector mechanism comprising a frame, manually operable push-buttons reciprocably mounted on said frame for selective operation in parallel relationship to one another, each push-button carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having generally triangular-shaped cam slots provided therein, the base portions of the triangles of which are all substantially parallel to one another and at right angles to the parallel lines of travel of the push-buttons, the triangles having inclined sides defining cam surfaces for slidable engagement with said pins to cam the slides endwise in transverse relationship to the parallel lines of travel of the push-buttons, the triangular cam slots in the several slides being disposed in different registering relationship for each operating position of the device actuating slide and for each corresponding button depressed so that when any one of said buttons is depressed the pin associated therewith causes the actuating slide to be moved by cam action to a predetermined position identified with that specific button, all of the triangular cam slots in the slides having their base portions in a common plane, the base angles of the triangles being arcuately conformed on a radius to fit the pins, said arcuate portions being of inwardly flaring form to give better mechanical advantage in the cam action of the pins by the slides and vice versa, the apex portion of at least one of the triangular slots in at least one of the slides being conformed further to define a detent notch extension which upon receiving a pin upon depression of a button serves to lock the mechanism in a certain setting until the button is at least partially withdrawn.

32. A push-button operated selector-ejector mechanism comprising a frame, manually operable push-buttons reciprocably mounted on said frame for selective operation in parallel relationship to one another, said push-buttons each carrying a pin movable therewith and disposed at right angles to the line of travel of the push-button, the pins being disposed in parallel relationship to one another, and selector-ejector slides and a device actuating slide reciprocable in said frame in stacked parallel relationship to one another and transverse relationship to said push-buttons and right angle relationship to said pins, said slides having pin receiving cam slots provided therein which are disposed in different registering relationship for each operating position of the device actuating slide and for each corresponding button depressed so that when any one of said buttons is depressed the pin associated therewith causes the actuating slide to be moved by cam action to a predetermined position identified with that specific button.

References Cited in the file of this patent

UNITED STATES PATENTS

| | | |
|---|---|---|
| 2,812,667 | Renaud | Nov. 12, 1957 |
| 2,887,898 | Javanovich et al. | May 26, 1958 |
| 2,910,885 | Bivacgua | Nov. 3, 1959 |
| 2,933,927 | Lyon | Apr. 26, 1960 |
| 2,933,945 | Brewster et al. | Apr. 26, 1960 |
| 2,933,948 | Thompson | Apr. 26, 1960 |